(12) United States Patent
Eroglu et al.

(10) Patent No.: US 7,908,842 B2
(45) Date of Patent: Mar. 22, 2011

(54) METHOD FOR OPERATING A GAS TURBINE, METHOD OF OPERATION OF A COMBINED CYCLE POWER PLANT, AND COMBINED CYCLE POWER PLANT

(75) Inventors: Adnan Eroglu, Untersiggenthal (CH); Jaan Hellat, Baden-Ruetihof (CH); Felix Guethe, Basel (CH); Peter Flohr, Turgi (CH)

(73) Assignee: ALSTOM Technology Ltd., Baden (CH)

( * ) Notice: Subject to any disclaimer, the term of this patent is extended or adjusted under 35 U.S.C. 154(b) by 182 days.

(21) Appl. No.: 12/326,519

(22) Filed: Dec. 2, 2008

(65) Prior Publication Data
US 2009/0094960 A1    Apr. 16, 2009

Related U.S. Application Data

(63) Continuation of application No. PCT/EP2007/054394, filed on May 7, 2007.

(30) Foreign Application Priority Data

Jun. 7, 2006 (CH) .................................... 0916/06

(51) Int. Cl.
*F02C 1/06* (2006.01)
*F02C 6/00* (2006.01)
(52) U.S. Cl. ............... 60/39.17; 60/780; 60/39.463
(58) Field of Classification Search ............ 60/39.463, 60/39.464, 781, 780, 39.12, 39.182, 39.17, 60/733
See application file for complete search history.

(56) References Cited

U.S. PATENT DOCUMENTS

| | | | | |
|---|---|---|---|---|
| 3,846,979 A | * | 11/1974 | Pfefferle | 60/774 |
| 4,507,914 A | * | 4/1985 | Rice | 60/39.17 |
| 5,329,758 A | * | 7/1994 | Urbach et al. | 60/775 |
| 5,465,569 A | * | 11/1995 | Althaus et al. | 60/773 |
| 5,577,378 A | | 11/1996 | Althaus et al. | |
| 5,689,948 A | | 11/1997 | Frutschi | |
| 5,901,547 A | | 5/1999 | Smith et al. | |
| 6,116,016 A | | 9/2000 | Wada et al. | |

(Continued)

FOREIGN PATENT DOCUMENTS

| | | |
|---|---|---|
| DE | 947843 | 8/1956 |
| EP | 0723068 | 7/1996 |
| EP | 0974789 | 1/2000 |

OTHER PUBLICATIONS

Joos, F., et al., "Entwicklung des sequentiellen Verbrennungs-systems fuer die Gasturbinenfamilie GT24/GT26," ABB Technik 1998, pp. 4-16, ABB Corporate Research, Germany.

(Continued)

*Primary Examiner* — William H Rodríguez
(74) *Attorney, Agent, or Firm* — Cermak Nakajima LLP; Adam J. Cermak

(57) ABSTRACT

In a method for operating a gas turbine (GT) with sequential combustion, which has at least one compressor (12, 13), a first combustion chamber (14) with a first turbine (15) which is connected downstream, and a second combustion chamber (16) with a second turbine (17) which is connected downstream, the at least one compressor (12, 13) draws in air and compresses it. The compressed air is fed to the first combustion chamber (14) for combusting a first fuel, and the gas which issues from the first turbine (15) is fed to the second combustion chamber (16) for combusting a second fuel. Increased flexibility and safety in operation is achieved by different fuels being used as first and second fuel.

12 Claims, 2 Drawing Sheets

U.S. PATENT DOCUMENTS

| | | | |
|---|---|---|---|
| 6,167,706 B1 | 1/2001 | Bronicki et al. | |
| 6,202,399 B1* | 3/2001 | Frutschi | 60/773 |
| 6,463,741 B1* | 10/2002 | Frutschi | 60/780 |
| 6,560,966 B1* | 5/2003 | Fetescu et al. | 60/775 |
| 7,353,655 B2* | 4/2008 | Bolis et al. | 60/775 |
| 7,503,178 B2* | 3/2009 | Bucker et al. | 60/774 |
| 7,584,599 B2* | 9/2009 | Benz et al. | 60/39.17 |
| 7,703,271 B2* | 4/2010 | Minkkinen et al. | 60/39.17 |

OTHER PUBLICATIONS

Search Report for Swiss Patent App. No. 0916/2006 (Sep. 19, 2006).
International Search Report for PCT Patent App. No. PCT/EP2007/054394 (Jun. 28, 2007).
International Preliminary Report on Patentability for PCT Patent App. No. PCT/EP2007/054394 (Sep. 9, 2008).

\* cited by examiner

METHOD FOR OPERATING A GAS TURBINE, METHOD OF OPERATION OF A COMBINED CYCLE POWER PLANT, AND COMBINED CYCLE POWER PLANT

This application is a Continuation of, and claims priority under 35 U.S.C. §120 to, International application number PCT/EP2007/054394, filed 7 May 2007, and claims priority therethrough under 35 U.S.C. §§119, 365 to Swiss application number No. 00916/06, filed 7 Jun. 2006, the entireties of which are incorporated by reference herein.

BACKGROUND

1. Field of Endeavor

The present invention refers to the field of gas turbines, to a method for operating a gas turbine, to an application of the method in a combined cycle power plant with integrated gasification, and also to a combined cycle power plant with integrated gasification useful for carrying out the method.

2. Brief Description of the Related Art

A combined cycle power plant with integrated gasification (integrated gasification combined cycle, IGCC) is normally operated with a synthetic gas (syngas or Mbtu gas), which is produced by gasification of coal, biomass, or other fuels (see, for example, U.S. Pat. No. 5,901,547). In order to improve the availability of the power plant and to ensure continuous power generation, an auxiliary operation either with natural gas or with a liquid fuel is normally necessary during the maintenance times of the gasification unit.

Such IGCC power plants are customarily started with an auxiliary fuel such as natural gas or oil, and then switched over to syngas after the gasification unit has been put into operation. The switching-over of fuel (fuel switchover, FSWO) from the auxiliary fuel to syngas is a very complex changeover process which is generally associated with load fluctuation, pulsations, and the risk of flashback. Furthermore, the risk of a trip of the gas turbine during the FSWO is extremely high.

In specific cases it is possible to individually switch over the fuel for each of the plurality of burner groups in a combustion chamber of the gas turbine, and so to reduce the extent of the load fluctuations or the risk of a trip of the gas turbine. This group-wise operation can also be used for a mixed combustion, where individual burner groups are operated with different fuel compositions, such as syngas/oil or syngas/natural gas.

The main problem with this previously described type of operation is an increased risk of flashback or of pulsations due to different flame shapes and pressure drop coefficients of burners in the same combustion chamber in the case of different fuels.

On the other hand, gas turbines have been known for quite some time (see U.S. Pat. No. 5,577,378 and A. Eroglu et al., Entwicklung des sequentiellen Verbrennungssystems für die Gasturbinenfamilie GT24/GT26, ABB Technik 4/1998, S. 4-16 (1998) (Development of the Sequential Combustion System for the GT24/GT26 Gas Turbine Family, ABB Technology 4/1998, p. 4-16 (1998))), which operate with reheating by a second combustion chamber. Unlike single-stage combustion, the sequential combustion with reheating by a second combustion chamber offers the possibility of operating each of the combustion chambers with different fuels. Such gas turbines with sequential combustion therefore enable new types of starting, operation, and mixed combustion in an IGCC power plant.

U.S. Pat. No. 5,689,948 discloses a gas turbine installation with sequential combustion, in which the two combustion chambers are basically operated with the same gaseous fuel. Reference is certainly made to the addition of oil as "auxiliary fuel" in the second combustion chamber in order to ensure the self-ignition.

U.S. Pat. No. 6,167,706 discloses a gas turbine installation with only one combustion chamber (105 in FIG. 8). A second external combustion chamber (106) only indirectly yields heat to compressed air, but does not act directly on a further turbine. The simultaneous use of different fuels for the two combustion chambers is not explicitly mentioned but only a series of possible fuels summarily listed.

Publication DE-C-947 843 discloses a gas turbine installation with a plurality of combustion chambers which, however, are all operated with the same gas from a pressure gasifier, which gas results either directly as pressurized gas or as sluice gas.

U.S. Pat. No. 6,116,016 discloses a gas turbine installation (FIG. 6) with two (sequential) combustion chambers, of which the first is operated with oil or natural gas, and the second operated with coal-derived gas.

Publication EP-A1-0 723 068 disclosed a gas turbine installation with sequential combustion, in which the two combustion chambers are operated with gaseous fuels of different H2 content, which fuels result during a reforming process.

SUMMARY

Several of the numerous aspects of the present invention relate to a method for operating a gas turbine, an application of the method in a combined cycle power plant with integrated gasification, and also a combined cycle power plant with integrated gasification useful for carrying out the method, which avoid the disadvantages of previous solutions and which are especially characterized by a very flexible and stable operation also and especially in changeover phases.

Another aspect of the present invention includes that the two combustion chambers of the gas turbine are operated with sequential combustion (at least partially) with different fuels, wherein the operation with the different fuels can especially also be carried out in a changeover phase, such as in a starting phase.

One development of a method embodying principles of the present invention is characterized in that a fuel from the group comprising syngas, natural gas, and liquid fuel, especially oil, is used as first and second fuel. By these fuel combinations a wide range of application and the possibility of a very flexible and interruption-free operation is created for this gas turbine.

A further development is characterized in that, for starting the gas turbine, the first combustion chamber in a first step is first of all operated with a first fuel from the group comprising natural gas and liquid fuel, especially oil, as the auxiliary fuel until the gas turbine has achieved a predetermined part, especially about 33%, of the base load, and in a second step the second combustion chamber is additionally operated with syngas as the second fuel until the base load is achieved. In particular, in the second step the first combustion chamber can be switched over to the operation with syngas.

Alternatively to this, another aspect includes that the second combustion chamber comprises a plurality of groups of burners, that for starting the gas turbine the first combustion chamber in a first step is first of all operated with a first fuel from the group comprising natural gas and liquid fuel, especially oil, as the auxiliary fuel until the gas turbine has achieved a predetermined part, especially about 33%, of the base load, and that in a second step the second combustion chamber is additionally operated first of all with a combination consisting of syngas and an auxiliary fuel from the group comprising natural gas and liquid fuel, especially oil, wherein the syngas and the auxiliary fuel are combusted in different burner groups, and that in a third step the second combustion chamber is finally operated entirely with syngas.

Another aspect includes a combined cycle power plant in which the first combustion chamber and/or the second combustion chamber have a plurality of burner groups which can be individually supplied with fuel, and that the burner groups can be selectively connected individually via the fuel distribution device to the fuel feed line or to the outlet of the gasification unit.

BRIEF DESCRIPTION OF THE DRAWINGS

The invention is to be subsequently explained in more detail based on exemplary embodiments in conjunction with the drawing. In the drawing

DETAILED DESCRIPTION OF EXEMPLARY EMBODIMENTS

Figure 1:
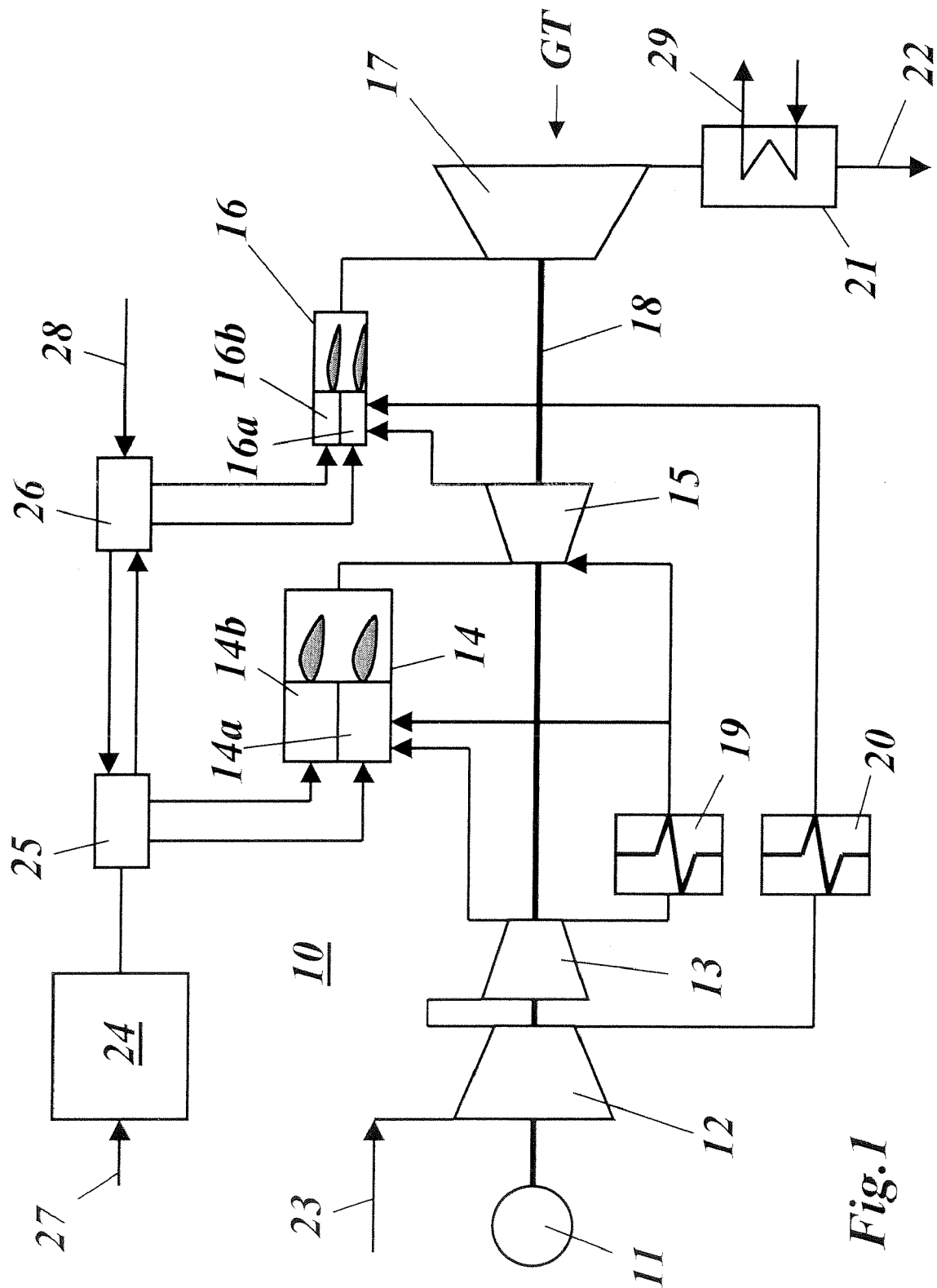
FIG. 1 shows in a much simplified block schematic diagram a combined cycle power plant with integrated gasification according to an exemplary embodiment of the invention.

In FIG. 1, in a much simplified block schematic diagram, a combined cycle power plant with integrated gasification, according to an exemplary embodiment of the invention, is reproduced. The combined cycle power plant 10 with integrated gasification includes a gas turbine GT which, on a shaft 18, has a low-pressure compressor 12, a high-pressure compressor 13, a high-pressure turbine 15, and a low-pressure turbine 16, and drives a generator 11. In the high-pressure turbine 15, hot gas from a first combustion chamber 14 is expanded, then directed to a second combustion chamber 16 and maintains a second combustion process there, the hot exhaust gases of which are expanded in the low-pressure turbine 17. The exhaust gases which issue from the low-pressure turbine 17 are fed through a heat recovery steam generator 21 in order to generate steam inside an associated water/steam cycle 29 for a steam turbine (not shown in FIG. 1). The cooled exhaust gases are finally discharged via an exhaust gas outlet 22 to an exhaust stack or the like with corresponding filtering capabilities.

From the high-pressure compressor 13, the first combustion chamber 14 obtains compressed combustion air which has been drawn in by the low-pressure compressor 12 via an air inlet 23 and is precompressed. At the outlet of the high-pressure compressor 13 (or at an intermediate stage, if necessary), compressed air is branched off, cooled in a high-pressure once-through cooler 19, and as cooling air is fed to the first combustion chamber 14 and to the high-pressure turbine 15. At the outlet of the low-pressure compressor 12 (or at an intermediate stage, if necessary), compressed air is similarly branched off, cooled in a low-pressure once-through cooler 20, and as cooling air is fed to the second combustion chamber 16.

The first combustion chamber 14 contains a plurality of burner groups 14a, 14b with a plurality of burners in each case which can be operated independently of each other and supplied with different types of fuel. Also, the second combustion chamber 16 contains a plurality of burner groups 16a, 16b which can be operated independently of each other and be supplied with different types of fuel. The burner groups 14a, b and 16a, b are only schematically shown in FIG. 1 and are symbolized by separate flames.

In addition to the gas turbine GT and the water/steam cycle 29 with the associated steam turbine, the combined cycle power plant 10 includes a gasification unit 24 in which coal, biomass, or another source material which is convertible into synthetic fuel gas can be gasified. The gasification unit 24 is reproduced in FIG. 1 only as a simple block, but includes a multiplicity of sub-units and connections to the remaining part of the combined cycle power plant 10, which serve especially for the production and feed of oxygen and for the cleaning of the gas which is produced. The gasification unit 24 is supplied with suitable source material (coal, etc.) via a first fuel feed line 27 and discharges the syngas which is produced, possibly via a temporary storage, to the gas turbine GT. Via a second fuel feed line 28, the gas turbine GT can furthermore be supplied with natural gas or liquid fuel, such as oil, as the additional fuel, which especially serves for supplementing the operation.

In order to fully exploit the very flexible operating possibilities of the gas turbine GT with sequential combustion in the present case of the combined cycle power plant with gasification, possibilities are provided for selectively operating not only the two combustion chambers 14 and 16 of the gas turbine GT with syngas from the gasification unit 24 or with an auxiliary fuel which is fed via the second fuel feed line 28, but also to operate each combustion chamber 14, 16 separately at the same time with the two fuels in an adjustable manner. In addition, the individual burner groups 14a, b and 16a, b of the combustion chambers 14 and 16 can be selectively operated with one of the fuels. For this purpose, a controllable and switchable fuel distribution device 25, 26 (exemplarily shown in FIG. 1) is provided, which on the inlet side is connected to the outlet of the gasification unit 24 and to the second fuel feed line 28, and on the outlet side leads to the individual burner groups 14a, b and 16a, b in the combustion chambers 14, 16. Inside the fuel distribution device 25, 26, for example controllable valves are arranged which can be opened or closed, or switched over, in order to direct one of the two fuels in the predetermined quantity to one of the burner groups 14a, b or 16a, b.

With such a configuration of the gas turbine GT and of its fuel supply, new types of fuel switchover (FSWO) and of combined feeding with two fuels can be brought about in an IGCC power plant. On account of the local separation of the two combustion chambers 14 and 16 in the gas turbine GT, it is possible to fire each of the combustion chambers with another fuel without risking load fluctuations, pulsations, or a flashback. In this way, it is especially conceivable to operate the one combustion chamber with syngas and on the other hand to operate the other combustion chamber with natural gas or liquid fuel, depending upon to which extent the individual fuels are available.

Figure 2:
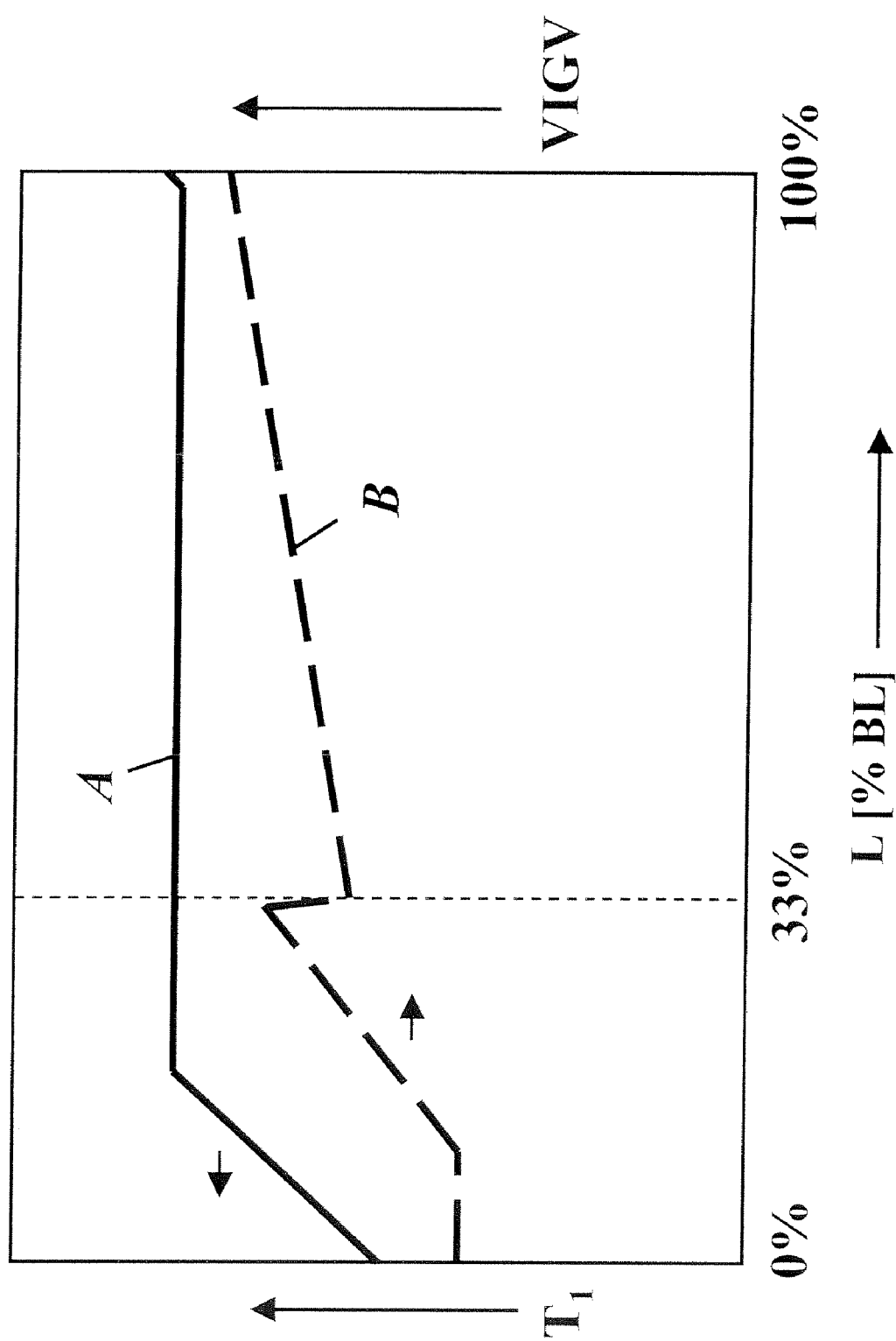
FIG. 2 shows the progression of the temperature ($T_1$) in the first combustion chamber and the position of the variable inlet guide vanes (VIGV) on the compressor, over the Load (L, in % of the base load, BL) of the gas turbine from FIG. 1, when running-up.

It is also possible, however, to run up the gas turbine GT by the first combustion chamber 14 being fired with natural gas or liquid fuel up to a certain load (L), and only then starting the second combustion chamber 16 exclusively with syngas. In FIG. 2, the upper curve A indicates the temperature $T_1$ in the first combustion chamber 14 for such a process, wherein the first combustion chamber 14 is operated with auxiliary fuel (natural gas or oil) up to a load L of about 33% of the base load BL, wherein up to a load of about 15% the temperature in the combustion chamber rises and then remains constant. From a load of 33% onwards, the second combustion chamber 16 is engaged and operated with syngas. The lower curve B, which is represented by a broken line, in this case shows the opening of the variable inlet guide vanes (VIGV). As a result of this, an additional reliability is achieved since the two combustion chambers 14, 16 are always uniformly operated with the same different fuels and the main and auxiliary fuels do not interact with each other. The gas turbine GT can then be run up to high loads where the first combustion chamber 14 can then be safely changed over to syngas without creating major fluctuations.

It is also conceivable, however, from 33% load, to operate the second combustion chamber with an auxiliary fuel. Furthermore, it is conceivable to operate one of the burner groups 16a, b in the second combustion chamber 16 with syngas, while another of the burner groups 16a, b is fired with an auxiliary fuel. In this way, the reheating combustion chamber can be operated at very low loads without any problem while the gasification unit 24 gradually begins to produce syngas.

The invention is altogether characterized by the following features and advantages:

In a gas turbine GT with sequential combustion at least two different combustion chambers are operated with different fuels such as syngas, natural gas of liquid fuel (oil).

In the individual combustion chambers, furthermore, separate burner groups may be available which are additionally operated with different fuels.

The gas turbine is started by auxiliary fuel in the first combustion chamber and run up to about 33% load. Then the second combustion chamber is first of all operated with syngas until finally at high loads the first combustion chamber is switched over to syngas.

Alternatively to this, the second combustion can be operated with syngas and auxiliary fuel in separate burner groups in parallel. If syngas is sufficiently available, the second combustion chamber is changed over entirely to syngas.

As a result of the separate firing of the combustion chambers with different fuels, great flexibility of the operation is achieved.

The simultaneous combusting of different fuels, which is variable within broad limits, in a combustion chamber in each case leads to increased availability.

The solution is characterized by great simplicity.

The risk of pulsations during fuel switchover is significantly reduced.

Likewise, the risk of a flashback during fuel switchover is significantly reduced.

List Of Designations
10 Combined cycle power plant with integrated gasification
11 Generator
12 Low-pressure compressor
13 High-pressure compressor
14, 16 Combustion chamber
14a, b Burner group
15 High-pressure turbine
16a, b Burner group
17 Low-pressure turbine
18 Shaft
19 High-pressure once-through cooler
20 Low-pressure once-through cooler
21 Heat recovery steam generator
22 Exhaust gas outlet
23 Air inlet
24 Gasification unit
25, 26 Fuel distribution device
27, 28 Fuel feed line
29 Water/steam cycle
GT Gas turbine While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for operating a gas turbine with sequential combustion, the gas turbine having at least one compressor, a first combustion chamber, a first turbine connected downstream of the first combustion chamber, a second combustion chamber, and a second turbine connected downstream of the second combustion chamber, the method comprising:

drawing in and compressing air with the at least one compressor;

feeding the compressed air to the first combustion chamber and combusting a first fuel in the first combustion chamber;

feeding gas from the first turbine to the second combustion chamber and combusting a second fuel in the second combustion chamber;

wherein said first and second fuels are different fuels, wherein at least one of the first combustion chamber and the second combustion chamber comprises a plurality of groups of burners, and wherein at least one of the first fuel and the second fuel is oil; and operating different burner groups inside at least one of the first and second combustion chambers with different fuels.

2. A method for operating a combined cycle power plant, the power plant including a gas turbine, the method comprising:

gasifying a source material in the combined cycle power plant to form syngas;

operating the gas turbine as claimed in claim 1; and introducing said syngas into at least one of the first fuel and second fuel.

3. A method for operating a gas turbine with sequential combustion, the gas turbine having at least one compressor, a first combustion chamber, a first turbine connected downstream of the first combustion chamber, a second combustion chamber, and a second turbine connected downstream of the second combustion chamber, the method comprising:

drawing in and compressing air with the at least one compressor;

feeding the compressed air to the first combustion chamber and combusting a first fuel in the first combustion chamber;

feeding gas from the first turbine to the second combustion chamber and combusting a second fuel in the second combustion chamber;

wherein said first and second fuels are different fuels, wherein at least one of the first combustion chamber and the second combustion chamber comprises a plurality of groups of burners;

operating different burner groups inside at least one of the first and second combustion chambers with different fuels;

wherein said gas turbine has a base load; and starting the gas turbine comprising:
(a) operating the first combustion chamber first with said first fuel and with an auxiliary fuel selected from the group consisting of natural gas and liquid fuel, until the gas turbine has achieved a predetermined part of said base load; and
(b) thereafter operating the second combustion chamber with syngas as the second fuel until the base load is achieved.

4. The method as claimed in claim 3, wherein said liquid fuel is oil.

5. The method as claimed in claim 3, wherein said predetermined part of the base load is about 33% of the base load.

6. The method as claimed in claim 3, further comprising: during said step (b), switching over said operating of the first combustion chamber to operating with syngas.

7. A method for operating a gas turbine with sequential combustion, the gas turbine having at least one compressor, a first combustion chamber, a first turbine connected downstream of the first combustion chamber, a second combustion chamber, and a second turbine connected downstream of the second combustion chamber, the method comprising:

drawing in and compressing air with the at least one compressor;

feeding the compressed air to the first combustion chamber and combusting a first fuel in the first combustion chamber;

feeding gas from the first turbine to the second combustion chamber and combusting a second fuel in the second combustion chamber;

wherein said first and second fuels are different fuels, and wherein at least one of the first combustion chamber and the second combustion chamber comprises a plurality of groups of burners;

operating different burner groups inside at least one of the first and second combustion chambers with different fuels;

wherein said gas turbine has a base load, and wherein the second combustion chamber includes a plurality of groups of burners; and starting the gas turbine comprising:
(a) operating the first combustion chamber first with said first fuel and with an auxiliary fuel selected from the group consisting of natural gas and liquid fuel until the gas turbine has achieved a predetermined part of the base load;
(b) thereafter operating the second combustion chamber with a combination of syngas and an auxiliary fuel selected from the group consisting of natural gas and liquid fuel, including combusting the syngas and the auxiliary fuel in different burner groups; and
(c) thereafter operating the second combustion chamber entirely with syngas.

8. The method as claimed in claim 7, wherein said liquid fuel is oil.

9. The method as claimed in claim 7, wherein said predetermined part of the base load is about 33% of the base load.

10. A combined cycle power plant with integrated gasification comprising:

a gasification unit having an outlet and being configured and arranged to produce syngas by gasification of a source material;

a gas turbine with sequential combustion, the gas turbine comprising at least one compressor, a first combustion chamber with a first turbine connected downstream of the first combustion chamber, and a second combustion chamber with a second turbine connected downstream of the second combustion chamber, and wherein the at least one compressor is configured and arranged to draw in and compress air and to feed the compressed air to the first combustion chamber for combusting a first fuel, and wherein the first turbine is in fluid communication with the second combustion chamber so that gas which issues from the first turbine is fed to the second combustion chamber for combusting a second fuel;

a fuel distribution device in fluid communication with at least one of the first combustion chamber and the second combustion chamber, the fuel distribution device being configured and arranged to distribute fuel to at least one of the first combustion chamber and the second combustion chamber; and a fuel feed line configured and arranged to feed an auxiliary fuel, the fuel feed line and the gasification unit outlet being in fluid communication with the fuel distribution device.

11. The combined cycle power plant as claimed in claim 10, wherein the fuel feed line is configured and arranged to feed natural gas or liquid fuel.

12. The combined cycle power plant as claimed in claim 10, wherein at least one of the first combustion chamber and the second combustion chamber has a plurality of burner groups configured and arranged to be individually supplied with fuel; and wherein the burner groups are in fluid communication with the fuel distribution device such that the burner groups can be selectively individually connected to the fuel feed line or to the gasification unit outlet by the fuel distribution device.

* * * * *